J. L. THIVOLLE.
EXPLOSION MOTOR.
APPLICATION FILED AUG. 13, 1912.
1,087,470.
Patented Feb. 17, 1914.
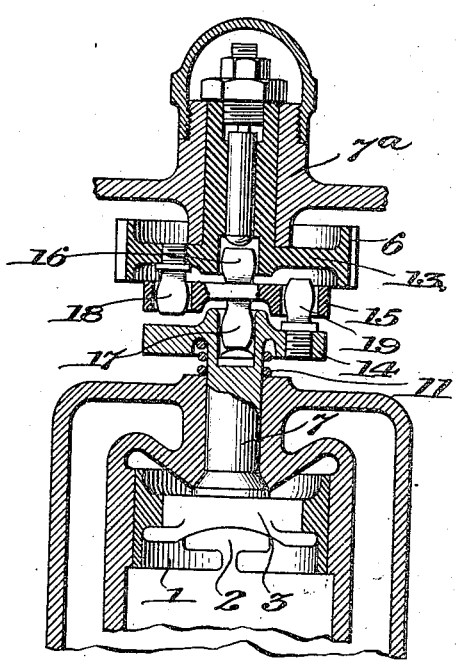
Witnesses:
John C. Sanders
Albert F. Heuman
Inventor:
Joseph Léon Thivolle
by W. Ballau Hill
Att'y.

UNITED STATES PATENT OFFICE.

JOSEPH LÉON THIVOLLE, OF DIJON, FRANCE, ASSIGNOR TO CONSTRUCTIONS INDUSTRIELLES DIJONNAISES, OF DIJON, FRANCE.

EXPLOSION-MOTOR.

1,087,470.  Specification of Letters Patent. Patented Feb. 17, 1914.

Original application filed July 26, 1911, Serial No. 640,652. Divided and this application filed August 13, 1912. Serial No. 714,761.

*To all whom it may concern:*

Be it known that I, JOSEPH LÉON THIVOLLE, a citizen of the French Republic, residing at Dijon, in France, have invented a certain new and useful Improvement in Explosion-Motors, of which the following is a specification.

This invention relates to valve gear for explosion motors and has for its object a 4-cycle explosion motor in which the distribution is effected by the rotation of a segmental valve member uncovering, at the proper times, the admission and exhaust ports.

Referring to the accompanying drawing which is a vertical sectional view taken through the axis of a cylinder the annular valve 1 is housed in the compression chamber of the cylinder. The motor piston moves in the remainder of the cylinder as usual. The valve is turned with a diameter slightly larger than that of the cylinder so that when in place its elasticity assures the gas tightness. It is cut away so as to leave between its extremities an interval 2 necessary for the passage of the gases.

The valve is engaged by a cross arm 3 secured to a rotatable member 7 passing through the end of the cylinder and having a plate 14 secured to its outer end. In alinement with the rotatable member 7 there is a second rotatable member $7^a$ mounted in any suitable manner and provided at its lower end with a plate 13 which is spaced from the plate 14. The members 7 and $7^a$ form a divided shaft. In order to rotate the member $7^a$ the plate 13 is provided on its periphery with helicoidal teeth adapted to be engaged by suitable gearing, not shown, so as to cause the valve to rotate once for every two rotations of the motor shaft.

Positioned between the plates 13 and 14 is a disk 15 which carries at its center two rounded pins 16 and 17 engaging cylindrical recesses in the axes of the rotatable members 7 and $7^a$. Each of the plates 13 and 14 is provided with pins 18 and 19, spaced equally distant from the divided shaft and engaging holes formed in the disk 15. A spring 11 is placed between the plate 14 and the cylinder in order to insure against leakage.

It can easily be understood that the action of one of the shafts on the other produces symmetrical balanced forces on each of the shafts; a slight decentering of the shafts could take place without altering the conditions of action. The shaft 7 and the valve 1 are thus protected from reactions which might act on the shaft $7^a$.

This application is a division of application Serial No. 640,652, filed July 26, 1911.

What I claim as my invention and desire to secure by Letters Patent of the United States is:—

In explosion motors, in combination, a cylinder having inlet and outlet ports, a rotatable valve for controlling the same, a transverse member mounted within said valve and adapted to have play with respect thereto, a divided shaft connected centrally of said transverse member and extending at right angles thereto, a disk interposed between the inner ends of said divided shaft, one member of said divided shaft extending through the cylinder head, plates upon the oppositely disposed inner ends of said divided shaft, pins carried by said plates and engaging said disk to form a driving connection between the said shaft and to prevent exterior forces reacting on said valve, means for driving said divided shaft, and means to prevent the escape of gases through the shaft bearings.

In testimony whereof I have signed my name to this specification in the presence of two subscribing witnesses.

JOSEPH LÉON THIVOLLE.

Witnesses:
 HENRI DE BUREN,
 EUGÈNE JURAND.